United States Patent [19]
Leffler, Jr., deceased

[11] 3,976,017

[45] Aug. 24, 1976

[54] LEGUMINOUS PLANT INOCULATION PROCESS AND APPARATUS

[76] Inventor: William A. Leffler, Jr., deceased, late of 421 Virginia Ave., Sanford, Fla. 32771, by Mary W. Leffler, Administratrix

[22] Filed: July 29, 1974

[21] Appl. No.: 492,581

[52] U.S. Cl. .......................................... 111/1; 111/7
[51] Int. Cl.² ............................................ A01C 23/02
[58] Field of Search ................................. 111/1, 7, 6

[56] References Cited
UNITED STATES PATENTS
2,968,266   1/1961   Gustafson ............................ 111/7 X OTHER PUBLICATIONS
*Seeds*, The Yearbook of Agriculture 1961, U.S. Government Printing Office, p. 327, column 1, lines 21–53 and column 2, lines 1–34.

*Primary Examiner*—Stephen C. Pellegrino
*Attorney, Agent, or Firm*—Roger L. Martin

[57] ABSTRACT

A process and apparatus used in inoculating leguminous plants with nitrogen fixing bacteria is disclosed. The process involves the preparation of an aqueous dispersion of the bacteria from a suitable source material and its dispensation to the soil in the fluid state and through the use of a separate dispenser from that handling the seeds. The apparatus includes a soil opening implement that forms a furrow during use and separate means for delivering the aqueous dispersion and seed to the furrow. A positive displacement pump provides quantitative dispensation of the bacteria.

3 Claims, 5 Drawing Figures

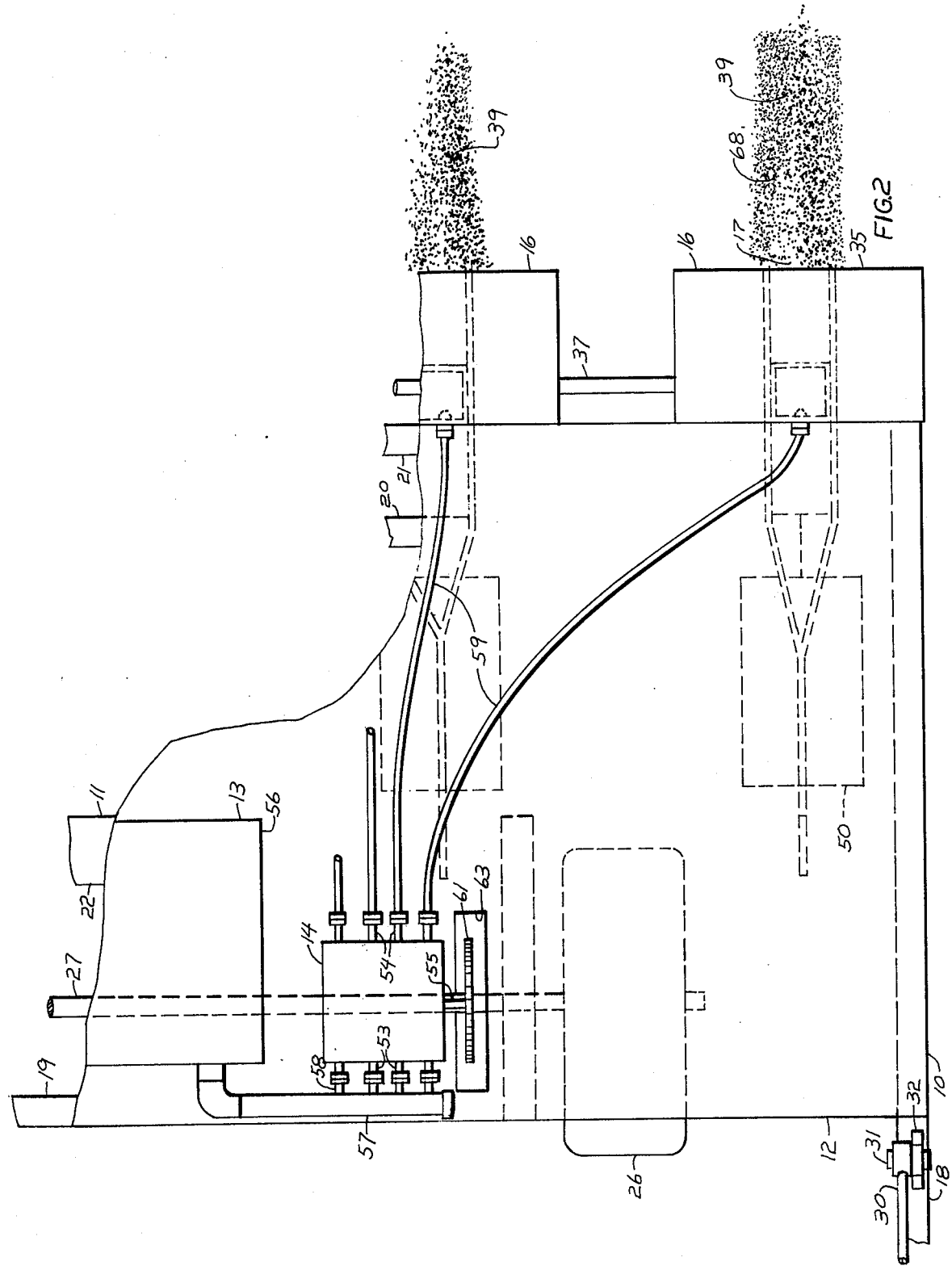

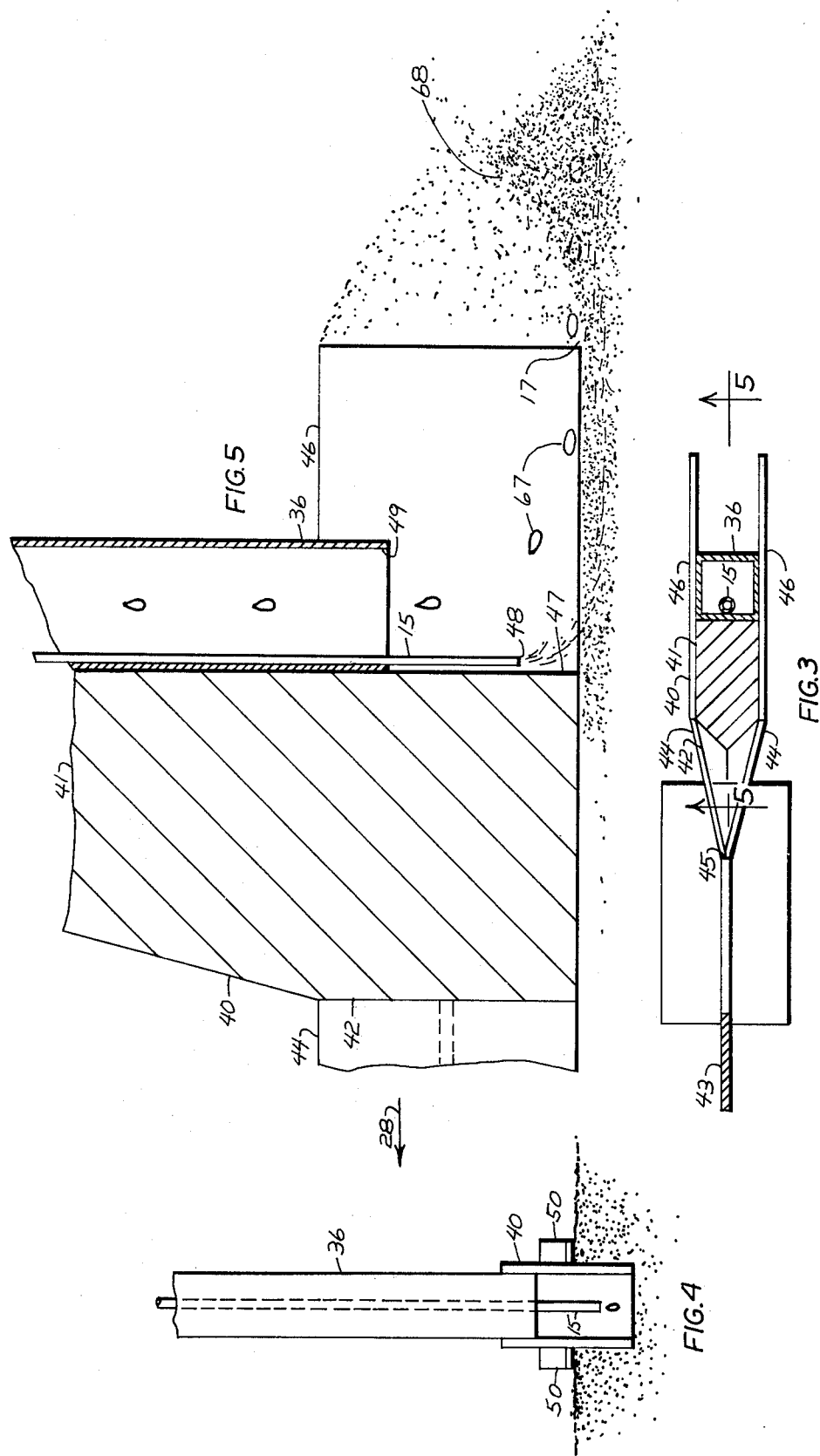

3,976,017

LEGUMINOUS PLANT INOCULATION PROCESS AND APPARATUS

The invention relates to a method for inoculating leguminous plants with nitrogen fixing bacteria and to an apparatus which is useful in carrying out certain steps in the inoculating process.

BACKGROUND OF THE INVENTION

The use of nitrogen fixing bacteria to promote the growth of leguminous plants is known. Bacteria of the rhizobia genera are used for such purposes and various strains have been isolated from the root nodules of selected leguminous plant varieties and from the soils in which such varieties are grown and are available as cultures in the marketplace for use in inoculating leguminous plants of the varieties thus selected. These cultures are available as fresh cultures of the bacteria in nutrient solutions, as concentrated and frozen cultures in nutrient solutions, and as cultures on agar.

In practice, there are two commonly used methods of introducing the bacteria to the soil. One method follows procedures which involve coating the legume or seed with material containing the viable bacteria so that the seed and bacteria are simultaneously introduced to the soil during the process of planting the legume or seed. The cultures in this case are usually premixed with a suitable solid carrier such as humus, sawdust, clay or other suitable particulate material by the supplier of the bacteria. Thereafter the farmer at the time of planting mixes the bacteria impregnated carrier and seed to be used in planting the crop in predetermined proportions and under conditions such that the seed becomes coated with the carrier. The coated seed is then transferred to the planting apparatuses and delivered to the soil.

The coated seed methods have certain disadvantages. For one, there is a need in many planting areas to protect the seed from fungus and/or insects during the period of germination. This is usually done by coating the seed with a suitable fungicide and/or insecticide and which are toxic to the bacteria. This fact, of course, precludes the use of the seed coating methods for introducing the bacteria to the soil in those farming areas where the need arises to use pesticides for the protection of the seed.

Yet another disadvantage to this method of introducing the bacteria to the soil can be attributed to the type apparatus which is used for planting the seeds and which require in most instances that the seed be substantially dry so as to avoid agglomeration and clogging of the seed drills. The bacteria on the other hand are sensitive to direct sunlight and elevated temperature conditions and require a viable moist and nutrient environment both prior to and following introduction to the soil. As a consequence it not infrequently happens that the bacteria is killed prior to its introduction to the soil because the seed dries out in the bulk containers that are used in the planting procedures or is alternatively subjected to such high temperatures in such containers as to effectively kill the bacteria. This problem with elevated temperatures is especially apparent in the southern regions of the United States.

The other common method for introducing the bacteria to the soil avoids the problems that are associated with the use of pesticides for coating the seeds. In this case the cultures are premixed with a suitable solid carrier of particulate material which is frequently formed into pellets and which is thereafter delivered to the soil by apparatus separate and apart from that used for delivering the seed to the soil. The devices used for delivering the bacteria to the soil in this instance also require that the particulate material be substantially dry so as to avoid clogging and this, of course, frequently leads to a high temperature and dry environment in the bulk containers used for handling the particulate material in the planting area and which, of course, is detrimental to the survival of the bacteria during the planting procedures.

BRIEF SUMMARY OF THE INVENTION

A general object of the invention is to provide improved methods for handling and delivering nitrogen fixing bacteria to the soil for purposes of inoculating leguminous plants and to provide an apparatus for use in the procedures. One particular object is to provide a method of the kind contemplated which avoids the need for handling bacteria containing solid materials that are difficult to distribute to the soil in conventional farm equipment. A further object of the invention is to provide simple procedures and apparatuses which minimize the loss of viable bacteria prior to their introduction to the soil and which facilitates the maintenance and proliferation of the bacteria in the soil while awaiting the germination of the seed. A further object is to provide a simple process and apparatus for delivering legumes and nitrogen fixing bacteria to the soil.

In accord with the process aspects of the invention the viable nitrogen fixing bacteria source material is mixed with potable water to form an aqueous dispersion of the bacteria and the fluid aqueous dispersion is delivered directly to the furrow as the legumes are being planted. The bacteria source material can be derived from any suitable source such as from a fresh culture of the bacteria in a suitable nutrient solution or from a frozen and concentrated bacteria source material. The bacteria may also be derived from nodules taken from the roots of plants of the same "host group" and may be dispersed in the aqueous solution by simply commutating the nodules and thereafter mixing the particulate material with the potable water.

In accord with the apparatus aspects of the invention the aqueous dispersion of the bacteria is dispensed to the soil through a conduit which provides for its delivery to the soil separately from the seed but into the proximate area in the furrow at which the seed is delivered as will be subsequently seen.

BRIEF DESCRIPTION OF THE DRAWINGS

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

FIG. 2 is a top plan view of a fragment of the apparatus seen in FIG. 1;

FIG. 3 is a horizontal section through one of the soil opening implements and adjacent structure as seen along the Lines 3—3 of FIG. 1;

FIG. 4 is an elevational view at the rear of the soil opening implement as seen along the Lines 4—4 of FIG. 1; and FIG. 5 is an enlarged sectional view through the implement and adjacent structure as seen along the Lines 5—5 of FIG. 3.

DETAILED DESCRIPTION OF THE INVENTION

Figure 1:
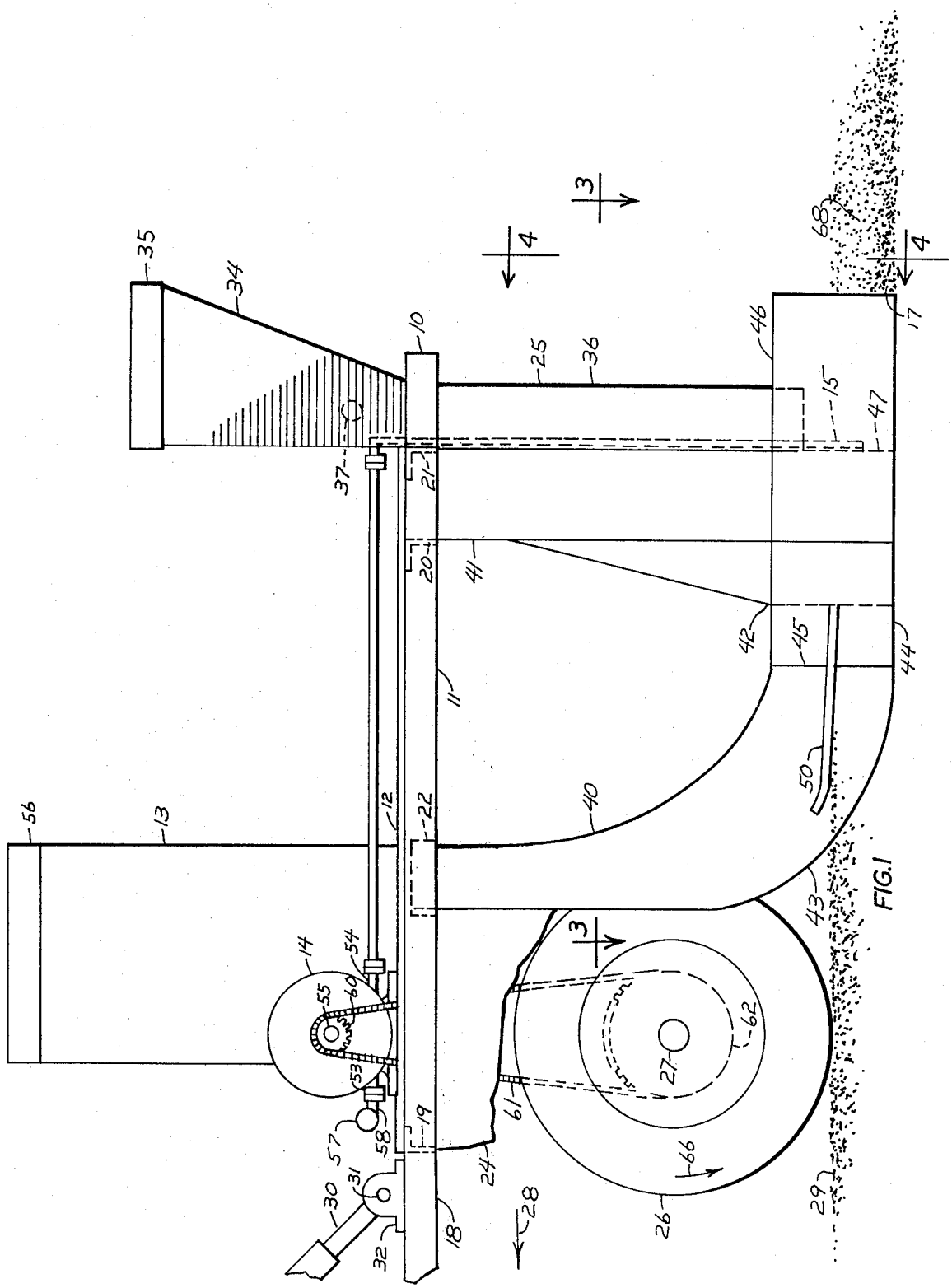
FIG. 1 is a side elevational view of a seed planting and bacteria infusion apparatus employing the principles of the invention, certain parts being broken away to expose others.

The principles of the invention will be described hereinafter with respect to the inoculation of the root systems of soybean plants with the Japonicum strain of rhizobia. The principles, however, may be readily applied to the inoculation of other leguminous plant varieties such as beans, peas, clover and peanuts, to name but a few, and through the use of an appropriate strain or cross-strain of rhizobia that is capable of a symbionic existence in the root system of the plant variety and of fixing nitrogen for assimilation by the plant.

The strains and cross-strains of rhizobia which are effective nitrogen fixing bacteria for the various leguminous plant varieties that are commonly cultivated are known. In the case of soybeans, the Japonicum strain is well recognized as an effective nitrogen fixing bacteria that will infect the root system of the soybean plants and thereafter, in a symbionic relationship, serve to fix atmospheric nitrogen that is assimilatable by the plant. The Rhizobium strain is available in the marketplace as cultures in which the viable bacteria are grown in nutrient solutions such as agar, and is also available as frozen concentrations in which, by centrifuging, the viable bacteria colonies have been concentrated in an aqueous media and thereafter frozen for preservation of the viable environment for the habitants. Such sources of bacteria may be employed in the procedures contemplated herein as well as other sources. For example, the nodules from plants of a variety contemplated for inoculation by the procedures advocated herein may be ground up or otherwise comminuted to provide a suitable source for the nitrogen fixing bacteria used in the inoculation of the variety.

In accord with the process of the invention, the viable bacteria containing source material is mixed with potable water to produce a fluid aqueous dispersion of the bacteria and this dispersion is thereafter delivered to the soil during the planting of the legumes in amounts providing sufficient viable bacteria in the proximate area of each seed to effectuate the formation of nodules in the root system of the plant grown from the seed.

The amount of water which is used in making the aqueous dispersion will depend upon the concentration of bacteria which is desired in the aqueous solution that is dispensed to the soil since the aqueous component of the dispersion mainly serves as a bacteria carrier which facilitates the handling of the bacteria before and during delivery to the soil and which additionally serves to maintain a viable environment for the maintenance and proliferation of the bacteria both before and following their introduction to the soil.

Use of the fluid carrier for the bacteria in accord with the process aspects of the invention has several advantages over the use of the solid carriers which are commonly used in the prior art procedures. For one, the aqueous dispersion can be conveniently prepared by simple mixing procedures and thereafter delivered to the soil without appreciable exposure to sunlight. Furthermore, the aqueous dispersion can be conveniently handled in a planting area having above ground temperatures which cause excessive temperatures in the bulk handling containers for solid materials and without encountering such excessive temperature rises. Additionally, the moist viable environment for the bacteria which is provided by the aqueous component of the dispersion continuously remains prior to the introduction of the dispersion to the soil so that the problems associated with moisture evaporation from the solid bacteria carriers is not encountered in the use of the aqueous dispersion. Additionally, the aqueous component of the dispersion provides a moist, viable soil environment for the bacteria after the dispersion is dispensed to the soil and thereby provides added assurance that the moist, viable soil and conditions will be maintained for the proliferation of the bacteria in the soil during the seed germination. The use of the aqueous carrier for the bacteria also enables the delivery to the soil of an inoculum in quantitative amounts through the use of conventional fluid dispensing equipment, thus avoiding the problems which are encountered with the handling of solid materials. Such equipment also facilitates the delivery of the bacteria into the immediate proximity of the legume in the furrow during the seed planting operation. The use of the fluid dispersion has the added advantage that the inoculum may be delivered to the soil separate and apart from the seed. It thus permits the use of bactericidal and fungicidal coatings on the legumes and also permits the admixture of plant nutrients with the seeds and which would otherwise adversely affect bacteria applied as a coating to the seed.

If desired, bacteria nutrients such as sugar, agar and yeast-manitol may also be dispersed or dissolved in the aqueous component of the dispersion so as to provide added assurance of a viable nutrient soil environment for the bacteria during the germination period for the seed.

In the preferred practice of the process a soil opening implement is moved along a contemplated row of the plants to continuously provide an open furrow and the seeds and aqueous dispersion are simultaneously delivered to the furrow from separate dispensers so that the bacteria assumes an initial level in the soil which is immediately beneath that of the seed and hence in the proximate area where the root systems develop during growth of the plant.

Reference is now made to the drawings and wherein an apparatus useful is carrying certain steps of the process into practice is generally shown in the drawings as a four row seed planting device which is equipped with a means for delivering an aqueous dispersion of the nitrogen fixing bacteria to the furrow simultaneously with the delivery of the seed. The apparatus 10 comprises a rigid frame 11 which supports a metal plate 12 on which a tank 13 and a positive displacement pump 14 are mounted for purposes of storing and delivering the fluid aqueous dispersion to the inoculum dispensing tubes 15 which are associated with the respective seed dispensers 16 of the apparatus.

The frame includes opposite side angles 18 which are interconnected in the frame structure by cross angles 19, 20 and 21 and by a transversely arranged channel member 22. These angles 19, 20 and 21 and channel member 22 are welded at their opposite ends to the side angles 19 and underlie the platform forming plate 12, as seen in the drawings.

Frame 11 is equipped with a pair of transversely spaced and depending brackets 24 and the frame is ground supported, when in the operating position 25 shown in FIG. 1, on a pair of ground contacting wheels 26 that are fixed to an axle 27. Axle 27 is journaled in suitable bearings (not shown) which are mounted in the brackets 24.

Apparatus 10 is adapted to be drawn in the direction of arrow 28 by a prime mover such as a tractor (not shown). At the front end of the apparatus, the side angles 18 are pivotally connected to the tractor for pivotal movement about a horizontal pivot axis (not shown), and the tractor is equipped with a pair of hydraulic cylinders which are used to pivotally raise and lower the apparatus with respect to the ground or soil level 29. The piston arms 30 of these cylinders are pivotally connected by means of pivots 31 to suitable lugs 32 which are fixed to the side angles 18 immediately in front of the plate 12, as seen in FIGS. 1 and 2.

The seed dispensers 16 are transversely spaced apart in the structure of the apparatus and are located at the rear end of frame 11 as seen in the drawings. Each dispenser includes an open hopper 34 which is equipped with a suitable cover 35. The dispensers 16 may be of a conventional type having a suitable mechanism located in the hopper for dispensing the seeds either individually or in groups to a seed drop tube designated at 36. Such seed dispensing mechanisms are well known in the art and may be driven by a common shaft 37 which is drivingly connected, as by means of a sprocket and chain-type drive connection (not shown), with the axle 27.

Each seed dispenser 16 is associated with a soil opening implement 40 that is adapted during movement along the surface 29 of the soil, as in the direction of arrow 28, to open a furrow 17 for the reception of the seeds delivered to the tube 36. These implements 40 which are illustrated in the drawings comprise an upright member 41 which is connected at its upper end to the frame 11 and which is equipped with a wedge-shaped leading edge portion 42 at its lower end. In front of member 41, the implement has a depending arcuate plate 43 which is connected at its upper end to channel member 22. Plate 43 is welded to a pair of diverging plates 44 at its rear end 45. These plates 44 are welded to the wedge-shaped portion 42 of member 41 and are provided with rearward extensions 46 that extend rearwardly in a parallel arrangement to project beyond the trailing edge 47 of the implement 40 so as to maintain an open furrow 17 in the immediate proximity of the outlet 48 for the inoculum dispensing tube or conduit 15 as well as in the immediate proximity of the discharge opening 40 for the seed drop tube 36. Each implement 40 is also provided with a pair of laterally extending and generally forwardly inclined plates 50 that are fixed to the ground cutting plate 43 and generally serve to limit the depth of penetration of the implement in the formation of the furrow 17. As seen in the drawings, the seed drop tube 36 associated with each implement is fixed to the rear side of member 41 and also houses the inoculum dispensing conduit 15 which is associated with the seed dispenser.

Pump 14 is a conventional positive displacement pump having a plurality of fluid inlets 53 which are connected internally in the pump by flexible conduits (not shown) to separate fluid outlets 54. The pump illustrated is of the well known pinch tube type and has rollers (not shown) which rotate with the drive shaft 55 of the pump and pinch the internal flexible tubes against the pump housing to effectuate displacement of the fluid in the flexible tubes toward their outlets. Tank 13 is equipped with a cover 56 and has an outlet pipe 57 that serves as a header which is connected by conduits 58 to the respective fluid inlets 53 for the pump. The outlets 54 of the pump 14, on the other hand, are each connected by a separate flexible conduit or tube 59 to one of the vertical conduits or tubes 15 that are used for dispensing the fluid inoculum into the furrows.

The drive shaft 55 of pump 14 is equipped with a sprocket 60 which is drivingly connected by an endless chain 61 to another sprocket 62 that is fixed to the wheel axle 27. Chain 61 extends through a slot-like opening 63 in plate 12, as best seen in FIG. 2. By virtue of the drive connection with the wheel assembly, pump 14 dispenses the fluid inoculum quantitatively to the dispensing tubes 15 and ultimately to each furrow 17 in amounts that are related to the velocity of the apparatus over the surface 29 of the soil. As such, each planting row 39 obtains an amount of fluid inoculum which is uniformly distributed along the length of the row and is continuously delivered to the furrow as the apparatus advances along the rows.

In the normal operation of the apparatus 10, the apparatus is drawn in the direction of arrow 28 by the prime mover. As this happens, the soil opening implements 40 open the furrows 17 along the rows 39. The penetration of the implement and hence the depth of the furrow 17 is primarily determined by the position of the slide plates 50 and as the apparatus moves along the surface 29 of the soil, the wheels 26 rotate in the direction of arrow 66 to drive the common shaft 37 for the dispensing mechanisms of the seed dispensers and simultaneously serve to drive the drive shaft 55 of pump 14. As this happens, the legumes or seeds in the dispenser 16 are dispensed through the seed drop tubes 36 where they fall into the furrows at the trailing edge 47 of the implement and through the tube discharge openings 49 between the plate extensions 46. Simultaneously, the operation of pump 14 is such that the fluid inoculum in the form of the prepared aqueous dispersion of nitrogen fixing bacteria is continuously dispensed from the outlet 48 of each inoculum dispenser tube 15 and where the dispersion falls into the bottom of the furrow 17 and thereby infuses the soil in the furrow beneath and in the immediate proximity of the legumes 67 delivered to the seed furrow (see FIG. 5).

In the normal operation of the apparatus, the walls 68 of the furrows 65 collapse immediately behind the extensions 46 as the apparatus is advanced and thus covers the seed and inoculum infused soil in the furrow with the soil from the side walls so that the viable bacteria in the aqueous dispersion delivered to the soil are almost immediately shielded from sunlight and from above ground temperatures as soon as the inoculum is delivered to the soil in the seed furrow. Auxiliary means may, of course, be used to fill in the furrows as the rows are planted.

As an example of the process as carried out to inoculate soybean plants, a frozen concentrated culture of the Japonicum strain of nitrogen fixing bacteria was used as the bacteria source material. This source material had a bacteria count of $2.54 \times 10^{10}$/cc. and was used in the preparation of an intermediate aqueous dispersion of the bacteria that could be conveniently handled and transported to the planting areas and thereat used for preparing more diluted aqueous dispersions that serve as inoculums for delivery to the soil.

In preparing the intermediate dispersion, the source material was initially thawed to ambient temperature conditions. Thereafter the intermediate dispersion was prepared by mixing 55 cc. of the concentrated culture by simple stirring procedures with sufficient potable water at ambient temperature conditions to provide a one gallon supply of the intermediate dispersion. This supply was then housed in a conventional opaque and thermally insulated container and transported to the planting area for the on the spot preparation of the dilute aqueous dispersions that were dispensed to the soil.

The dilute aqueous dispersions which were dispensed to the planting area were prepared in thirty gallon quantities by mixing 1 quart of the intermediate dispersion with sufficient potable water to provide the thirty gallon quantity of the aqueous dispersion. This was accomplished by simply pouring the potable water and one quart quantity of the bacteria dispersion into a 30 gallon tank which served as the supply tank from which the bacteria was pumped to the furrows as the legumes were planted. The tank was immediately covered to shield the supply from direct sunlight after 4 ounces of granular sugar had been added to the tank to provide nutrients for the bacteria introduced to the soil. This dilute aqueous dispersion was then delivered to the soil simultaneously with the planting of seed through the use of apparatus similar to that depicted in the drawings and the solution was dispensed at the rate of 5 gallons per acre where the rows were spaced apart at 30 inch intervals and the soybeans planted at the rate of about 10 to 12 seeds per linear foot in each row.

The seed used in the planter was precoated with Captan in amounts of about 1 ounce per bushel of seed for pesticide control purposes and throughout the growing season the plants were well fertilized with potassium and phosphorous containing fertilizers. It was observed that nodules were well formed on the plants about 10 days after emergence and that yields derived from the planting areas averaged about 50 bushel of soybeans per acre. In contrast to this, yields varied from about 10 to 40 bushel of soybeans per acre in other planting areas in the local and wherein the bacteria was coated on the seeds and delivered to the soil by the more conventional procedures.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. The improved method of inoculating a leguminous plant with viable nitrogen fixing bacteria comprising mixing viable bacteria as derived from a predetermined source with potable water to produce a fluid aqueous dispersion of the viable bacteria, opening a seed furrow in soil to be used for growth of the plant, simultaneously delivering the fluid aqueous dispersion and a legume productive of the plant into the open seed furrow to thereby infuse the soil in the furrow beneath the delivered legume with the viable bacteria, and thereafter immediately covering the infused soil and delivered legume with soil to thereby shield the infused soil from sunlight.

2. The improved method of planting a row of legumes in soil for growing leguminous plants therefrom and of inoculating the leguminous plants with viable nitrogen fixing bacteria comprising mixing the viable bacteria as derived from a predetermined source with water to produce a fluid aqueous dispersion of the viable bacteria, moving a soil opening implement in a predetermined direction along the contemplated row to continuously open a seed furrow at the trailing edge of the implement during such movement, continuously dispensing the aqueous dispersion and the legumes into the open seed furrow at said trailing edge during such movement along the row to thereby infuse the soil beneath each legume delivered to the open furrow with viable bacteria, and covering each delivered legume and the infused soil therebelow with soil immediately following the delivery of the legume to the open furrow to thereby shield the infused soil beneath the legume from sunlight.

3. The improved method of planting a row of legumes in soil for growing leguminous plants therefrom and of inoculating the leguminous plants with viable nitrogen fixing bacteria comprising mixing viable bacteria as derived from a predetermined source with potable water to produce a field aqueous dispersion of the viable bacteria, moving a soil opening implement in a predetermined direction along the contemplated row to continuously open a seed furrow at the trailing edge of the implement during such movement, continuously dispensing legumes from a supply thereof into the open seed furrow during such movement, and continuously pumping the aqueous dispersion from a separate supply thereof and into the open furrow during such movement to thereby infuse the soil beneath each legume delivered to the open furrow with viable bacteria, and covering each delivered legume and the infused soil therebelow with soil immediately following the delivery of the legume to the open furrow to thereby shield the infused soil beneath the legume from sunlight.

* * * * *